Oct. 25, 1938.　　　　R. M. ROWELL　　　　2,134,581
RECORDING INSTRUMENT
Filed June 9, 1934　　　　2 Sheets-Sheet 2
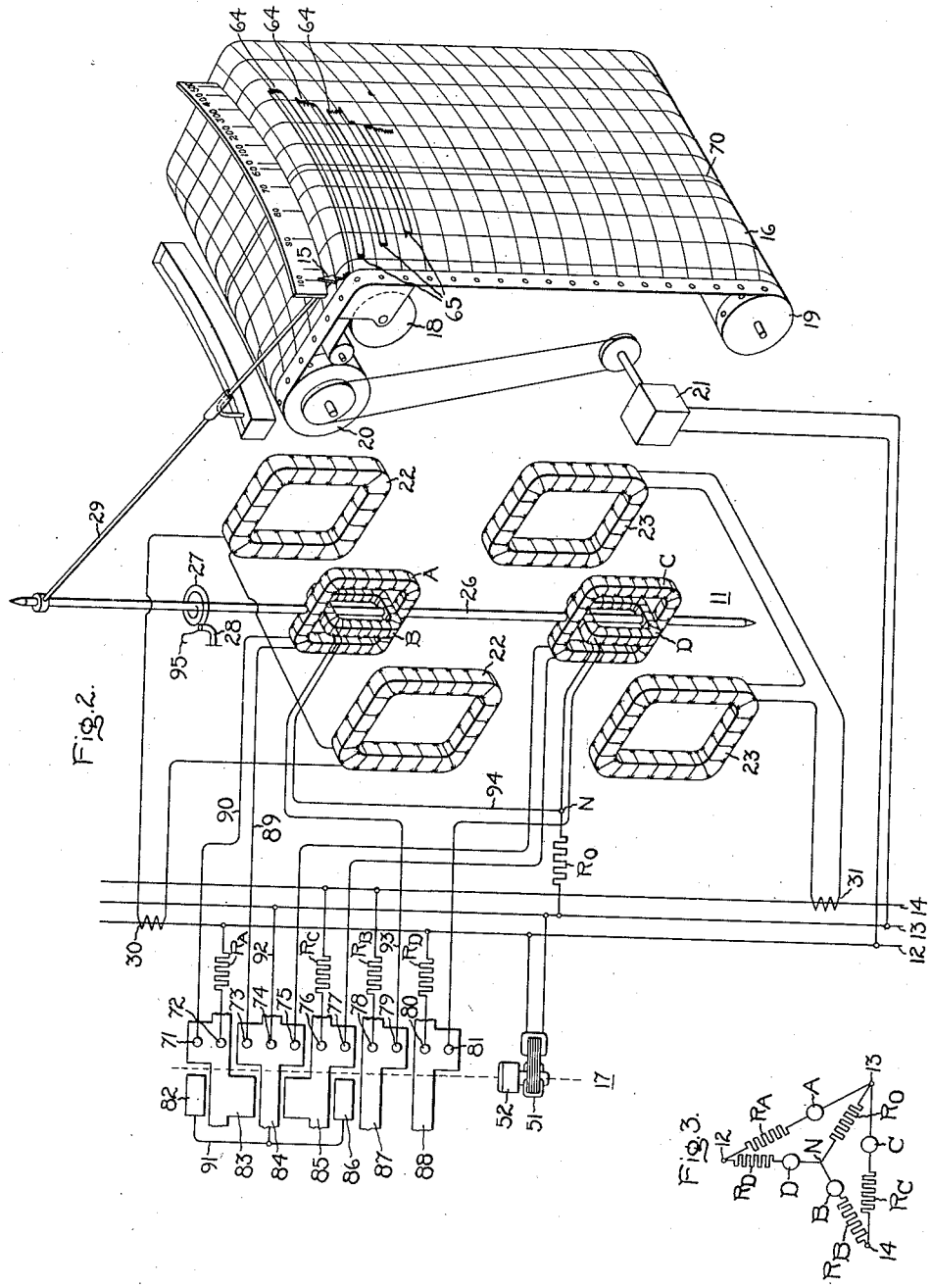
Inventor:
Ralph M. Rowell,
by Harry E. Dunham
His Attorney.

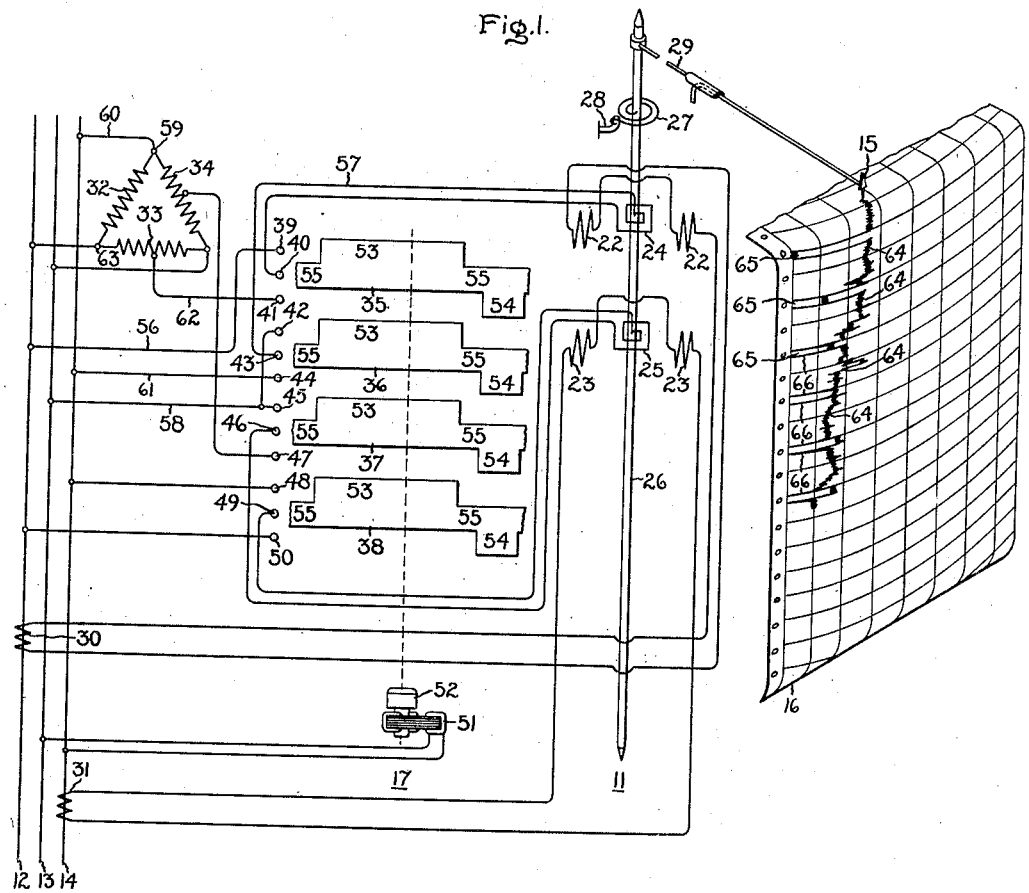

Patented Oct. 25, 1938

2,134,581

UNITED STATES PATENT OFFICE 2,134,581

RECORDING INSTRUMENT

Ralph M. Rowell, Lynn, Mass., assignor to General Electric Company, a corporation of New York Application June 9, 1934, Serial No. 729,838

7 Claims. (Cl. 234—5.5)

My invention relates to measuring instruments and concerns particularly methods and devices for indicating or recording a plurality of different quantities.

One of the objects of my invention is to provide an arrangement for obtaining with a single instrument mechanism records of more than one quantity on a record chart.

A further object is to obtain a substantially continuous record of variations of power in an alternating current circuit together with a record of power factor or a record from which power factor may be deduced. Apparatus for recording power factor directly together with power is described and claimed in my copending divisional application, Serial Number 218,781, filed July 12, 1938, and assigned to the same assignee as the present application.

Another object is to provide a device for obtaining records of both real and reactive power.

Still another object of my invention is to produce an instrument for measuring either the ratio of two quantities or the magnitude of one of them, more particularly an instrument for measuring both power factor and power in an alternating current circuit.

It is also an object to provide an instrument for measuring either the angular relationship between two vectors or their product.

In United States Patent 1,904,029 to Knopp there is shown a recording three-phase wattmeter operating by the two-wattmeter method. One of the wattmeter units is periodically disconnected to cause the device to record an indication having no independent significance. From this indication in conjunction with the value of power, the value of power factor may be calculated. It is an object of my invention to provide an instrument giving records of two different quantities having independent significance.

In carrying out my invention in its preferred form, I provide a strip-chart recorder with a dynamometer type instrument mechanism and a device for periodically changing the connections so that the instrument mechanism deflects in response alternately to watts and to some other quantity of an alternating current circuit dependent upon the phase relationship between potential and current. In one embodiment of the invention, an ordinary wattmeter mechanism is employed and the coils are periodically reconnected to cause the deflection to represent reactive power and, in another embodiment of the invention, quadrature coils are added to the wattmeter mechanism, which is periodically reconnected to cause the deflection to represent power factor directly.

The features of my invention which I believe to be novel and patentable will be pointed out in the claims appended hereto. A better understanding of my invention, itself, however, may be obtained by referring to the following description taken in connection with the accompanying drawings in which Figs. 1 and 2 are schematic and circuit diagrams of two embodiments of my invention, and Fig. 3 is a diagram of connections of the instrument elements illustrating phase relationships between the elements and the phases of a three-phase system.

The apparatus is shown connected to a three-phase alternating current system for recording the power and the power factor conditions therein but it will be understood that my invention is not limited to polyphase circuits nor to measurements of these precise quantities. Referring now more in detail to the drawings in which like reference characters are used to designate like parts throughout, the apparatus consists of an instrument mechanism 11 connected to conductors 12, 13 and 14 of an electrical system and carrying a graph-drawing implement, such as a movable pen 15, stylus or other suitable marking point, a record strip 16 cooperating with pen 15 to produce the desired records of quantities in the electrical system, and a rotating drum switch 17 changing the connections of the instrument mechanism 11 back and forth at a uniform rate of speed.

The record strip 16 may be mounted and caused to travel at a uniform speed in any desired manner. For example, the strip or chart 16 may be unwound from a feed roll 18 (Fig. 2) onto a re-roll 19 passing over a timing roll 20 driven by a timing motor 21 in a manner well known to those skilled in the art.

In the electrodynamometer type instrument mechanism illustrated in Fig. 1, stationary coils 22 and 23 cooperate respectively with movable coils 24 and 25 mounted upon a common shaft 26. The shaft 26 is biased to a zero position by means of a spiral spring 27 fastened at one end to the shaft 26 and at the other end to a lug 28 on the stationary portion of the apparatus (shown only in part). The pen 15 is mounted on an arm 29 carried by the shaft 26. A sufficient number of stationary and movable coils are employed to form a number of single-phase wattmeter units, one less than the number of conductors of the polyphase line to which the apparatus is connected in accordance with the well known method of measuring polyphase power. Thus, in the present case, with a three-conductor system 12—13—14, the coils 22 to 25 are employed to form two units 22—24 and 23, 25, and, of course, for a single-phase two-wire system, only one wattmeter unit would be required.

Suitable means are employed for periodically changing the connections of the wattmeter units 22—24 and 23—25 to cause reactive power to be indicated instead of real power. If desired, a rotating drum switch as shown at 17 may be used for this purpose and the change in connection may be made in the circuits of the movable coils 24 and 25. The stationary coils 22 and 23 are permanently connected in series with conductors 12 and 14, respectively, or, if desired, the coils 22 and 23 may be connected through series transformers 30 and 31. In accordance with the normal wattmeter connections, the movable potential coil 24 is connected between conductors 12 and 13, as will be apparent from the description hereinafter of the drum switch 17. Likewise, the movable potential coil 25 is normally connected between conductors 13 and 14.

To obtain reactive power indications, the potential coils are reconnected so as to be acted upon by voltages in quadrature with the voltages acting thereon during the real power connections. This may be accomplished by means of phase shifters or phase splitters, by connecting inductance or capacitance in series with coils 24 and 25 or simply by connecting the coils to different points in a polyphase system. For example, as shown in Fig. 1, a three-phase autotransformer or three reactances 32, 33 and 34 connected in delta to conductors 12, 13 and 14 may be employed. For indicating reactive power, coil 24 is connected between conductor 14 and the midpoint of reactance 33, and coil 25 is connected between conductor 12 and the midpoint of reactance 34, as will become apparent when the operation of drum switch 17 is described hereinafter. Another arrangement which may be used for obtaining quadrature voltages will be described in connection with Fig. 2.

The drum switch 17 consists of a plurality of rotatable ring contacts 35 to 38 cooperating with a plurality of stationary contacts 39 to 50. The ring contacts 35 to 38 are carried by a drum, not shown, rotated at a uniform rate of speed by any suitable device such as, for example, a synchronous motor 51 connected to lines 13 and 14 and having speed-reducing gearing 52. For clarity, the ring contacts 35 to 38 are represented by a development of their cylindrical surface but it will be understood that they are actually portions of a cylindrical surface and that the stationary contacts 39 to 50 actually lie tangent to this cylindrical surface.

As the drum switch 17 rotates, the portions 53 and 54 alternately come past the stationary contacts to produce the effect of two double-pole double-throw switches alternately shifting the connections of coils 24 and 25 and the intervening narrow portions 55 serve to open the connections between shifts. When portions 53 are under the stationary contacts, power measurement connections are made and a circuit is formed from conductor 12 through a conductor 56, contact 39, ring 35, contact 40, conductors 57 and coil 24, contact 43, ring 36, contact 42, and conductor 58, back to conductor 13. In a similar manner, coil 25 is connected between conductors 13 and 14.

Likewise, when portions 54 are under the stationary contacts, reactive power measurement connections are made and a circuit is formed from common terminal 59 of reactances 32 and 34 through conductor 60, conductor 14, conductor 61, contact 44, ring 36, contact 43, conductors 57 and coil 24, contact 40, contact 41, and conductor 62, to the midpoint of reactance 33. In a similar manner, coil 25 is connected between common terminal 63 of reactances 32 and 33 and midpoint of reactance 34.

The reactances 32, 33 and 34 have been placed in the drawings in such a manner that their directions represent the vector relations of the voltages therein. It is evident that, as the coil 24 is alternately connected across reactor 33 and from the midpoint of reactor 33 to terminal 59, the voltage acting on the coil 24 is shifted 90 degrees in phase. The coil 25 is affected in like manner.

The portions 53 of the drum switch 17 have been made greater in length than the portions 54 in order that the longer time periods 64 of the curve in the chart 16 will represent recorded values of real power, and the shorter time periods 65 will represent recorded values of reactive power. The value of power factor at the end of a stated interval can, of course, be readily deduced from the values of real and reactive power at an instant corresponding to the beginning or end of one of the time periods 64 or 65. To facilitate a clear distinction between the portions of the curve giving the real power and the reactive power, the pen 15 is caused to drop to the zero line at the end of each time period 64 or 65, producing the transverse lines 66, marking the long and short periods 64 and 65 during which real power and reactive power, respectively, are recorded. That is the operation of switch 17 and the advance of the record sheet are coordinated or synchronized and for this purpose both may be driven by synchronous motors connected to the same A. C. supply system as shown in Fig. 2. As previously explained, the narrow portions 55 of the rings of drum switch 17 open the connections of the coils 24 and 25 to permit the instrument mechanism to fall back to the zero position.

In the embodiment of my invention illustrated in Fig. 2, quadrature potential coils B and D are added to the movable member to form crossed-coil elements A—B and C—D. It will be seen that the coil B is displaced in space phase from the coil A, and likewise the coil D is displaced in space phase from the coil C. The coils A and C are power component potential coils and correspond to the movable coils 24 and 25 of Fig. 1. The drum switch 17 is so arranged that, in one position which I shall call the watt-indicating position, coils B and D are disconnected and coils A and C are connected to react with stationary coils 22 and 23 to deflect the pen 15 to the right-hand side of chart 16, to the right of the double line 70, to provide a record 64 of the real power of alternating current system 12—13—14. In the other position (that illustrated in the drawings), which I shall call the power-factor-indicating position, all the potential coils A to D are connected and the connection is such that the pen 15 deflects to the left of the double line 70 on chart 16 and produces a record 65 of power factor.

The arrangement and the power factor connections of the stationary and movable coils illustrated in Fig. 2 are similar to those described in my Patent No. 1,929,289 relating to power-factor meters for balanced or unbalanced polyphase circuits.

Although in the present application I have illustrated and described apparatus used with three-wire three-phase circuits, my invention is obviously not limited thereto.

The drum switch 17 comprises a plurality of stationary contacts 71 to 81 and a plurality of ring contacts 82 to 88 shown by a surface development but actually lying along the surface of a cylinder. When the drum switch 17 is in the position illustrated, the power-factor-indicating position, with the stationary contacts touching the portions of the ring contacts shown at the right, the movable coils are connected as shown in Fig. 3 and the phase relationships of the voltages in the coils are also as indicated by the directions of the sides of the triangles in which the coils are shown. Resistors $R_A$ to $R_D$ are the usual current-limiting resistors used with potential coils, and $R_O$ is a resistor added to permit obtaining an artificial neutral N which permits obtaining quadrature voltages for the quadrature potential coils $R_B$ and $R_D$ without additional apparatus, but, of course, the quadrature voltages may be obtained in any desired manner.

When the drum switch 17 is in the watt-indicating position for which the portions of ring contacts 82 to 88, shown at the left, are under the stationary contacts 71 to 81, the coils B and D are disconnected and the coils A and C are connected as shown in Fig. 3, but with their terminals reversed so that they tend to deflect the movable element in the opposite direction from before.

The manner in which the drum switch 17 changes the connections may be better understood by tracing one of the coil circuits for each position. In the watt-indicating position there is a circuit from line conductor 12 through resistor $R_A$, contacts 72, 83, and 73, conductor 89, coil A, conductor 90, contact 82, conductor 91, contacts 86 and 74, and conductor 92, to line conductor 13. Similarly, a circuit may be traced for coil C from line conductor 13 to line conductor 14.

In the power-factor-indicating position, of drum switch 17, there is a circuit from line conductor 12 through resistor $R_A$, contacts 72, 83 and 71, conductor 90, coil A, conductor 89, contacts 73, 84 and 74, and conductor 92, back to line conductor 13. It will be observed that the connections of coil A are reversed from those for the watt-indicating position.

In the power-factor-indicating position, there is also a circuit from line conductor 14 through resistor $R_B$, contacts 78, 87 and 79, conductor 93, coil B, conductor 94, artificial neutral N, resistor $R_O$ to line conductor 13. Similarly, circuits may be traced for coils C and D.

Although, for convenience, I have referred to two different positions of the drum switch 17, it will be understood that the switch 17 actually rotates continuously and that each connection is maintained during slightly less than one-half a revolution of the switch 17. If desired, of course, the lengths of arc of the segments might be changed in order to obtain relatively longer or shorter periods during which either real power or power factor is recorded. Although I have shown separate motors 51 and 21 for driving the drum switch 17 and the chart 16, it will be understood that a single motor might also be employed if desired.

The spiral biasing spring 27 on shaft 26 is provided with a hook 95 which engages the pin 26 on the stationary portion of the apparatus as the pen 15 deflects to the right-hand one of the pair of lines 70 on chart 16 which corresponds to the zero position of the real power scale. As the elements deflect further to the right, the biasing spring 27 is wound up to provide the necessary restraining torque to cause pen 15 to come to rest at a point on the chart 16 corresponding to the value of real power measured. When the pen 15 deflects to the left of the lines 70, however, the hook 95 of biasing spring 27 is disengaged and the position of the pen 15 depends upon the balancing of the torques produced by movable coils A and C against the torques produced by coils B and D in accordance with the well known manner of operation of power factor meters or ratio instruments of the crossed-coil type.

The position of the movable coils illustrated with coils A and C parallel to stationary coils 22 and 23 and coils B and D perpendicular thereto corresponds to 100 per cent power factor. Owing to the fact that the power component potential coils A and C and the reactive component coils B and D each tend to align themselves parallel to the current coils 22 and 23, the angular position of the movable element depends upon the relative values of the torques acting upon the power component coils and the reactive component coils. Since coils B and D have quadrature potentials impressed upon them, they produce torques corresponding to the reactive component of volt amperes called "reactive power" and they do not produce any torque when the reactive power is zero, as at 100 per cent power factor. At 100% power factor, therefore, the movable element assumes a position with power component coils A and C parallel to current coils 22 and 23. As the power factor decreases, however, and the reactive power increases, coils B and D produce torques which tend to deflect pen 15 to the right in opposition to the torques produced by coils A and C which become less in proportion since the real power is less in proportion.

It will be noted that the coils A and C tend to deflect pen 15 to the left for the power-factor-indicating connection. However, when the connections of coils A and C are reversed, and coils B and D are disconnected for the watt-indicating connection, coils A and C tend to deflect pen 15 to the right of double line 70 to produce records of real power. It will be understood that preferably means are provided for damping the motion of the movable element as is customary in measuring instruments.

In the apparatus illustrated, no graduations are shown in the power-factor scale below 60 degrees and the arrangement of the instrument mechanism and the chart mechanism is such that smaller values of power factor cannot be recorded since ordinarily such low power factors are not encountered in well-equipped power transmission systems.

It will be understood, however, that my invention is not limited to the range of power factors shown; that, by a suitable arrangement of the chart 16 and the instrument mechanism 11 permitting a wider angle of deflection for the power-factor scale, any desired range of power factors may be recorded.

It is evident that the apparatus of Fig. 2 has a wider scope than merely the recording of certain quantities in an alternating current circuit. Fundamentally, the apparatus is a combination meter for measuring either one of two quantities or the ratio between them. The apparatus, as shown, records either real power or the ratio of real power to apparent power (volt-amperes)

which ratio is also a function of the ratio of real power to reactive power, in terms of which latter ratio, the scale might, if desired, be calibrated. Since power factor is also a function of the angle between voltage and current and power is the product of the two vector quantities, voltage and current, my apparatus serves also to measure either the product of two vectors or the angle between them. Arranged as shown, the apparatus measures real power when deflecting to the right of double line 70 but, if desired, the apparatus might be rearranged to disconnect coils A and C instead of coils B and D so that reactive power would be measured instead. Expressed in mathematical terms, the apparatus would then measure the vector product of current and voltage instead of the scalar product of current and voltage since real power and reactive power are, respectively, the scalar and vector products of current and voltage, i. e., the arithmetic products of current and voltage multiplied by the cosine and sine, respectively, of the angle between them. Real and reactive power are thus co-functions.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. In combination with an alternating-current electrical circuit, a double-record curve-drawing instrument having an instrument mechanism including relatively movable elements carrying current and potential windings, respectively, the windings of one of said elements consisting of a pair of crossed coils, means for subjecting said current and potential windings to the current and voltage, respectively, of said circuit, apparatus for displacing the current in one of said crossed coils substantially 90 degrees in phase from the current in the other, a switch for connecting and disconnecting one of said coils to and from said apparatus, and means for operating said switch intermittently.

2. In a double-record curve-drawing polyphase instrument, an instrument mechanism having windings forming a plurality of mechanically-connected electro-dynamometer-type instrument units, each comprising a current coil and cooperating therewith a pair of crossed potential coils, means for displacing the phase of the voltage applied to one of each pair of crossed coils, together forming a polyphase power-factor-responsive mechanism deflecting in a given direction, and a switch for periodically disconnecting one of the crossed coils of each unit and reversing the connection of the other crossed coil, thereby forming of said units a polyphase real-power-responsive mechanism tending to deflect in the opposite direction.

3. In a double-record curve-drawing alternating-current instrument, an instrument mechanism, phase-shifting apparatus and a switch, said instrument mechanism including relatively movable current and potential elements comprising current-conducting windings, the windings of one of said elements consisting of a pair of crossed coils, one of which is connected to said phase-shifting apparatus, said switch being arranged periodically to open circuit one of said coils.

4. A double-reading instrument comprising a pair of relatively movable members carrying elements producing fields of force, one of which members carries a pair of elements producing fields of force acting at an angle to each other, said elements being energized to act in opposition, thus reacting with said other member with opposing torques, disengageable resilient means for biasing one of said members to a given position with respect to the other, said biasing means being positioned to come into engagement when relative movement of said members to said given position takes place and to disengage when the opposite relative movement of said members takes place, and means for making one of said elements inactive and making the direction of force of the other element such as to bring said biasing means into engagement.

5. A double-reading instrument for comparing functions of vector quantities having a pair of relatively movable members, one of said members comprising means for producing a field of force proportional to one of two vector quantities, the other of said members carrying a pair of elements, one of said elements comprising means for producing a second field of force proportional to another vector quantity, the other of said elements comprising means for producing a field of force at an angle to said second field of force also proportional to the latter vector quantity but displaced in phase therefrom, said elements being energized to act in opposition, thus reacting with said first member with opposing torques, disengageable resilient means for biasing one of said members to a given position with respect to the other, said biasing means being positioned to come into engagement when relative movement of said members to said given position takes place and to disengage when the opposite relative movement of said members takes place, and means for making one of said elements inactive and reversing the direction of force of the other element to bring said biasing means into engagement.

6. A double-reading instrument for comparing vector quantities having a pair of relatively movable members, one of said members comprising means for producing a field of force, the other of said members carrying a pair of elements, one of said elements comprising means for producing a second field of force proportional to a vector quantity, the other of said elements comprising means for producing a field of force at an angle to said second field of force proportional to another vector quantity, said elements being arranged to act in opposition, thus reacting with said first member with opposing torques, disengageable resilient means biasing one of said members to a given position with respect to the other, said biasing means being positioned to come into engagement when relative movement of said members to said given position takes place and to disengage when the opposite relative movement of said members takes place, and means for making one of said elements inactive and reversing the direction of force of the other element to bring said biasing means into engagement.

7. A duplex electrical instrument for alternating-current circuits comprising a pair of inductively reacting relatively movable members comprising current and potential windings, respectively, one of which comprises a pair of elements transverse to each other, apparatus for displacing the current in one of said elements substantially 90 degrees in phase from the current in the other, said elements being connected to act in opposition, means for disconnecting one of said elements and reversing the connections of the other, and disengageable resilient means for biasing one of said members to a given position with respect to the other, the disengageable means being arranged to engage in response to relative motion of the members in one direction and to disengage in response to relative motion of the members in the other direction and being so placed that, when both of said elements are connected, the movable element deflects in a direction to disengage said biasing means.

RALPH M. ROWELL.